United States Patent
Abele et al.

(10) Patent No.: US 9,578,359 B2
(45) Date of Patent: *Feb. 21, 2017

(54) LOCALIZATION PROCESS SYSTEM

(71) Applicant: Pixwel Platform, LLC, Calabasas, CA (US)

(72) Inventors: Nathan Abele, Wynnewood, PA (US); James Tosi, Santa Monica, CA (US); Philip Zlotorynski, North Hills, CA (US); Jeffrey Loiselle, Somerville, MA (US)

(73) Assignee: Pixwell Platform, LLC, Calabasas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/004,678

(22) Filed: Jan. 22, 2016

(65) Prior Publication Data
US 2016/0142751 A1    May 19, 2016

Related U.S. Application Data

(63) Continuation of application No. 14/498,471, filed on Sep. 26, 2014, now Pat. No. 9,271,050.
(Continued)

(51) Int. Cl.
| | |
|---|---|
| *H04N 21/254* | (2011.01) |
| *H04N 21/488* | (2011.01) |
| *H04N 21/258* | (2011.01) |
| *H04N 21/422* | (2011.01) |
| *H04N 21/485* | (2011.01) |
| *G11B 27/034* | (2006.01) |

(Continued)

(52) U.S. Cl.
CPC ...... *H04N 21/2541* (2013.01); *G06F 3/04842* (2013.01); *G11B 27/034* (2013.01); *G11B 27/34* (2013.01); *H04N 21/25841* (2013.01); *H04N 21/4221* (2013.01); *H04N 21/431* (2013.01); *H04N 21/4627* (2013.01); *H04N 21/475* (2013.01); *H04N 21/47205* (2013.01); *H04N 21/4856* (2013.01); *H04N 21/4884* (2013.01); *H04N 21/4888* (2013.01); *H04N 21/854* (2013.01); *H04N 21/85406* (2013.01)

(58) Field of Classification Search
CPC .................................................. H04N 21/4856
See application file for complete search history.

(56) References Cited

U.S. PATENT DOCUMENTS

2002/0006271 A1   1/2002   Winter et al.
2002/0161579 A1   10/2002   Saindon et al.
(Continued)

*Primary Examiner* — Justin Shepard
(74) *Attorney, Agent, or Firm* — SoCal IP Law Group LLP; M. Kala Sarvaiya; Steven C. Sereboff (57) ABSTRACT

There is disclosed apparatuses and methods for a localized process system. The apparatuses and methods include a server for authenticating a user login for a localized process system; presenting a user with a project, comprising an asset, wherein the project is a movie, and wherein the asset is created for an original geographical territory; presenting a user with a display to order a localized version of the asset, wherein the localized version of the asset is a version of the asset that is customized for a second geographical territory that is different than the original geographical territory; receiving user input to create subtitles for the localized version of the asset, wherein the user selects himself to enter the subtitles; presenting the user with a display of a timed-text script that displays a time of the asset, and the dialog of the asset.

26 Claims, 7 Drawing Sheets

Related U.S. Application Data

(60) Provisional application No. 61/883,145, filed on Sep. 26, 2013.

(51) Int. Cl.
| | | |
|---|---|---|
| *G11B 27/34* | (2006.01) | |
| *H04N 21/472* | (2011.01) | |
| *H04N 21/854* | (2011.01) | |
| *G06F 3/0484* | (2013.01) | |
| *H04N 21/431* | (2011.01) | |
| *H04N 21/4627* | (2011.01) | |
| *H04N 21/475* | (2011.01) | |

(56) References Cited

U.S. PATENT DOCUMENTS

| | | |
|---|---|---|
| 2010/0030578 A1 | 2/2010 | Siddique et al. |
| 2011/0279634 A1 | 11/2011 | Periyannan et al. |

LOCALIZATION PROCESS SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from the following patent applications: U.S. application Ser. No. 14/498,471, titled "Localization Process System" and filed on Sep. 26, 2014, now U.S. Pat. No. 9,271,050, which claims priority to U.S. Application No. 61/883,145, titled, "Subtitle Management System" and filed on Sep. 26, 2013.

BACKGROUND

Field

This disclosure relates to a system to send and receive multimedia files via HTTP for purposes of generating automated localized audiovisual material with real time preview. The system can generate a customized and localized version of a multimedia file.

Description of the Related Art

Entertainment studios around the world release new media projects on a daily basis. These media projects include songs, movies, documentaries, TV shows, short films, trailers, featurettes, sound bites, teasers, feature films, commercials, film clips, red carpet interviews, feature film interviews, and digital billboards. Typically, these media projects are released in a certain language and have narration and graphics that are suitable for the chosen language of the project.

With the advancements in technology and the wide variety of media projects available online and accessible anywhere in the world, there is a desire to distribute these media projects quickly and efficiently in various languages, either by adding subtitles to the media project, or by modifying the dialogue of the media project. In addition, as viewers now are able to watch these media projects in various mediums, there is a need to provide these media projects in various usage formats, including broadcast, online, theatrical, educational and cross-media. The media projects originally released will need to be encoded based on the medium that the project will be used in.

Modifying each new media project released to create versions to support various regions and languages is a large task. Prior art systems required a user to manually modify the project into another language. However, such systems create a bottleneck because it is dependent on when the manual process of updating the project is completed.

As a result, there is a need for a system to facilitate the process of creating new versions of media projects which may need to be encoded into various formats and which support various regions and various languages, either through translations or subtitles into the desired languages.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
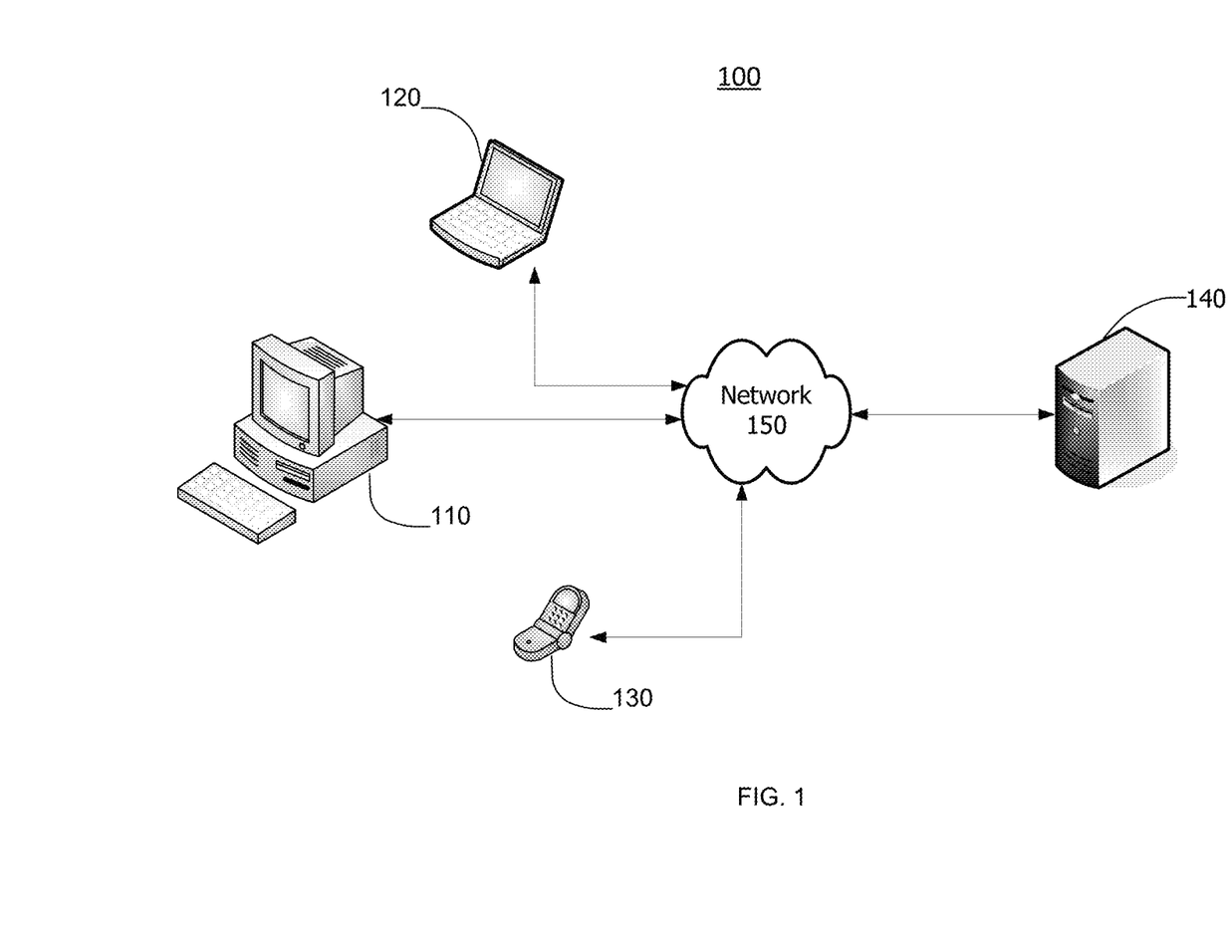
FIG. 1 is a block diagram of an environment for a localization process system.

Referring now to FIG. 1, there is shown a block diagram of an environment 100 for a localization process system. The environment includes 100 includes client systems 110, 120 and 130, and a server system 140. The client systems 110, 120 and 130 are operated by a user, not shown. The environment 100 may be implemented using distributed computing and interconnected by a network 150. The client systems 110, 120, and 130 are shown as computers, smartphones, and tablets. However, the client systems can include any similar devices that may be used by a user to access the server 140 in order to use the localization process system. Each of the client systems 110, 120 and 130 and the server system 140 are computing devices described below with reference to FIG. 2.

The client systems 110, 120 and 130 are used by users who desire to view various media projects that are available to them. In addition, users use the client systems to view notifications regarding the projects they subscribe to. Further, users use the client systems to order localized versions of various projects. The "user" is the person or entity interacting with the system to upload projects, view projects, review notifications relating to projects, modify content in the projects, and order new versions of projects, which may include subtitles or translations into a language not supported in the original version of the project.

A "project" is a media project, such as a movie, owned by a studio, or a user of the system. Each project may consist of various "assets" of varying types, such as trailers, music songs, music videos, movies, documentaries, audio books, trailers, teasers, sound bites and featurettes. An "asset" is a component of a project. An asset may comprise one or many files. For example, a project may be a movie such as Movie A. That project may comprise numerous assets, including trailers, teasers, sound bites and featurettes. These assets may be texted or textless. "Texted" is an asset with text graphics overlaid on the asset. "Textless" is an asset that does not include any text graphics overlaid on the asset. These assets may further be separated by Territory. For example, if a project has an asset that is a trailer for a feature film, there may be multiple assets for different parts of the world. There are various types of assets. For example, a trailer is very different from a sound bite and as such, each of those assets would include different metadata that may be utilized when modifying the assets into a new language for a viewer.

The client systems 110, 120 and 130 may include software and/or hardware for providing functionality and features described herein. A client system may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the client systems 110, 120 and 130 may include various specialized units, circuits, software and interfaces for providing the functionality and features described here. The processes, functionality and features may be embodied in whole or in part in software which operates on a client computer and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by a client computer and others by other devices.

The network 150 may be or include a local area network, a wide area network, wireless networks and the Internet. The network 150 interconnects the client systems 110, 120 and 130 and the server system 140. The network 150 enables communication of data between the various interconnected elements. The network 150 may provide access to additional, outside services such as an Internet-based escrow service.

Figure 2:
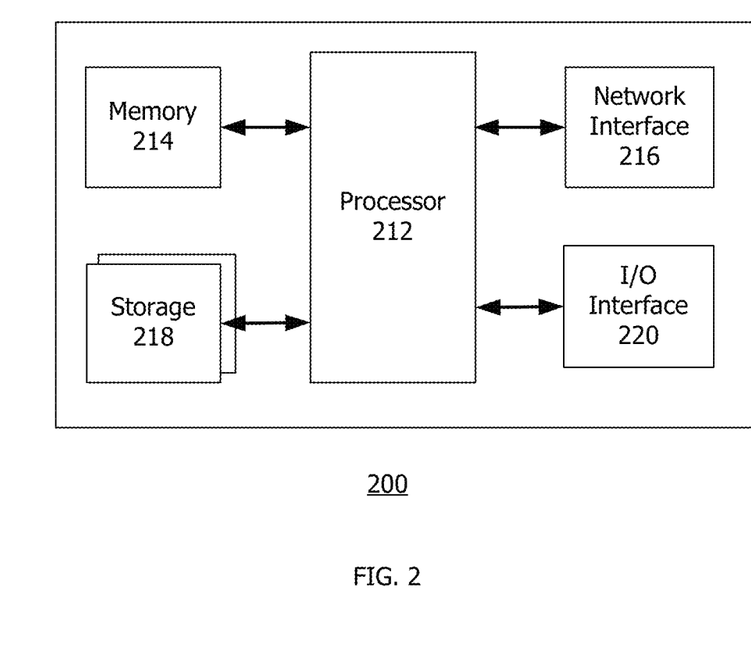
FIG. 2 is a block diagram of a computing device.

Turning now to FIG. 2, there is shown a block diagram of a computing device 200, which is representative of the client systems 110, 120, 130 and the server system 140, as seen in FIG. 1. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 212 coupled to a memory 214, storage 218, a network interface 216 and an I/O interface 220. The processor 212 may be or include one or more microprocessors, field programmable gate arrays (FPGAs), application specific integrated circuits (ASICs), programmable logic devices (PLDs) and programmable logic arrays (PLAs).

The memory 214 may be or include RAM, ROM, DRAM, SRAM and MRAM, and may include firmware, such as static data or fixed instructions, BIOS, system functions, configuration data, and other routines used during the operation of the computing device 200 and processor 212. The memory 214 also provides a storage area for data and instructions associated with applications and data handled by the processor 212.

The storage 218 provides non-volatile, bulk or long term storage of data or instructions in the computing device 200. The storage 218 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the term storage medium corresponds to the storage 218 and does not include transitory media such as signals or waveforms. In some cases, such as those involving solid state memory devices, the memory 214 and storage 218 may be a single device.

The network interface 216 includes an interface to a network such as network 150 (FIG. 1).

The I/O interface 220 interfaces the processor 212 to peripherals (not shown) such as displays, keyboards and USB devices.

Figure 3:
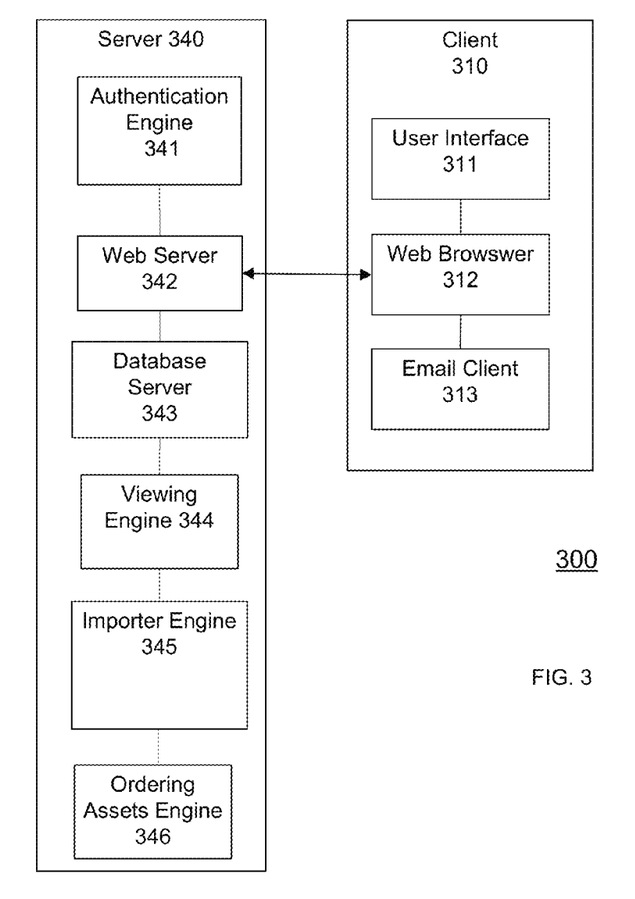
FIG. 3 is a block diagram for a localization process system.

Turning to FIG. 3, there is shown a block diagram for a localization process system. The system 300 comprises a server 340 and a client 310, such as server 140 and client 110 in FIG. 1.

The server 340 comprises an authentication engine 341, a web server 342, a database server 343, a viewing engine 344, an importer engine 345 and an ordering assets engine 346.

The authentication engine 341 comprises functionality to authenticate a user before providing access to the localization process system to the user. The projects accessible through the localization process system are typically media projects that are owned by various entertainment companies. As a result, it is of primary importance that the localization process system only permit access to users who have been authenticated and verified as authentic users of the subtitle management system.

The localization process system 341 may utilize various methods for authenticating a user. Before a user can be authenticated on the system, the user first needs to create an account on the system. The system may include various ways for a user to create an account. For example, a user could obtain an account by visiting the localization process system, and registering for a new account. When registering for a new account, the user may be required to provide an email address, a full name and a password. The system will then review the user's domain and send a request for approval to the administrator for that domain. For example, if a user was registering an @MovieStudioA domain, an approval might first be sent to the administrator at Movie Studio A who is monitoring the group members on the system. Alternatively, a new user may be added to the system when an existing user of the system shares a project or asset with another user who is not registered on the system. The user not yet registered on the system may receive an email requesting the user to register and then the user will have access to the shared project or asset from the existing user. Finally, a user may be added to the system by receiving an invitation from an administrator. For example, the administrator of the Movie Studio A group members, may invite additional users to the system who have not yet registered on the system. The system may impose restrictions on the user's access on the system. For example, a user may only be permitted to view certain assets or projects. Similarly, a user may be permitted to edit an asset.

Once a user has registered on the system, the user can use his account credentials on the system to view projects or assets that the user has subscribed to based on the user's permissions. However, before the user can view the projects on the system, the user must be authenticated by the authentication engine 341.

The authentication engine 341 may use tokens to verify the user. When a user authenticates with the system, the system may generate a token for the session, and that token will be resubmitted with each request. Tokens may allow a user to view projects without having to resubmit their username and password. The tokens may be configured to expire after a set time period, thereby preventing another user to steal a token from an existing user. If a user's token expires or is canceled, the user will receive an error message and will then be asked by the system to generate a new token. After a user successfully logs onto a system, the system may present projects or assets to the users based on the group that the user belongs to. For example, if the user was on the Movie Studio A domain, the administrator may configure the user's account to provide permissions to view projects, but not to share projects. The administrator also may configure global permissions which will cause all of the members in the group to have the same access as others in the group.

The server 340 may also comprise a web server 342 and a database server 343. The server 340 is shown as a single server incorporating a database server 343 and a web server 342. The server 340 may actually be a number of interrelated servers and computing resources. In this way, the database server 343 may be a stand-alone server separate and apart from the web server 342. The database server 343 and web server 342 may also be made up of a number of physical servers, each logically linked and operating in concert. The database server 343 may store the files for the projects and assets. Alternatively, the database server 343 may store links to the locations for the project and asset files, which may reside on another server. The server 340, however physically configured, is responsible for accessing the database server 343 databases to thereby provide the web server 342 with information to fill web pages served to the client 310. These databases may contain information related to the various assets that comprise a project, each user on the system and the projects they have permission to view and access, a list of orders placed on the system for localized versions of a project, and other related information necessary for the system.

The server 340 may also comprise a viewing engine 344. The viewing engine 344 provides functionality to allow users to view and monitor projects or assets on the system. Once a user has been authenticated and permitted access to the system, the user may access projects or assets to view. In addition, the user may have access to filter the assets for a project based on the asset type. For example, if the user only wanted to see the list of trailers for a movie, then the user could filter based on the asset type. In addition to viewing projects, the viewing engine 344 may also allow the user to share projects with other users of the system, or with users who have not yet registered with the system.

The viewing engine 344 may also provide users the ability to view any notifications from the system with respect to the projects and assets that the user has permission to access. Examples of notifications from the system include, a notification that an asset or project has been shared with the user, a notification that notes were added to an asset, a notification that an embargo for a project was lifted, a notification that files are awaiting to be downloaded, a notification that a new asset is added to a project, a notification that an existing file is overwritten by a new version, a notification that a vendor creates or sends a work request to an entertainment company, and a notification that a work request is marked as completed by an entertainment company. When a user logs into the system, the user may see that there are notifications pending. The user then may select the notifications, and then may be able to view all of the pending notifications.

The viewing engine 344 may also allow a user to receive pushed media files, or projects. If an administrator wants to push a project to a user, then the administrator may use an interface to push various types of assets to the user. When the user logs into the system, the user may receive a notification that a new project has been pushed to his account. The user may then select to download the project to the client system.

Figure 4:
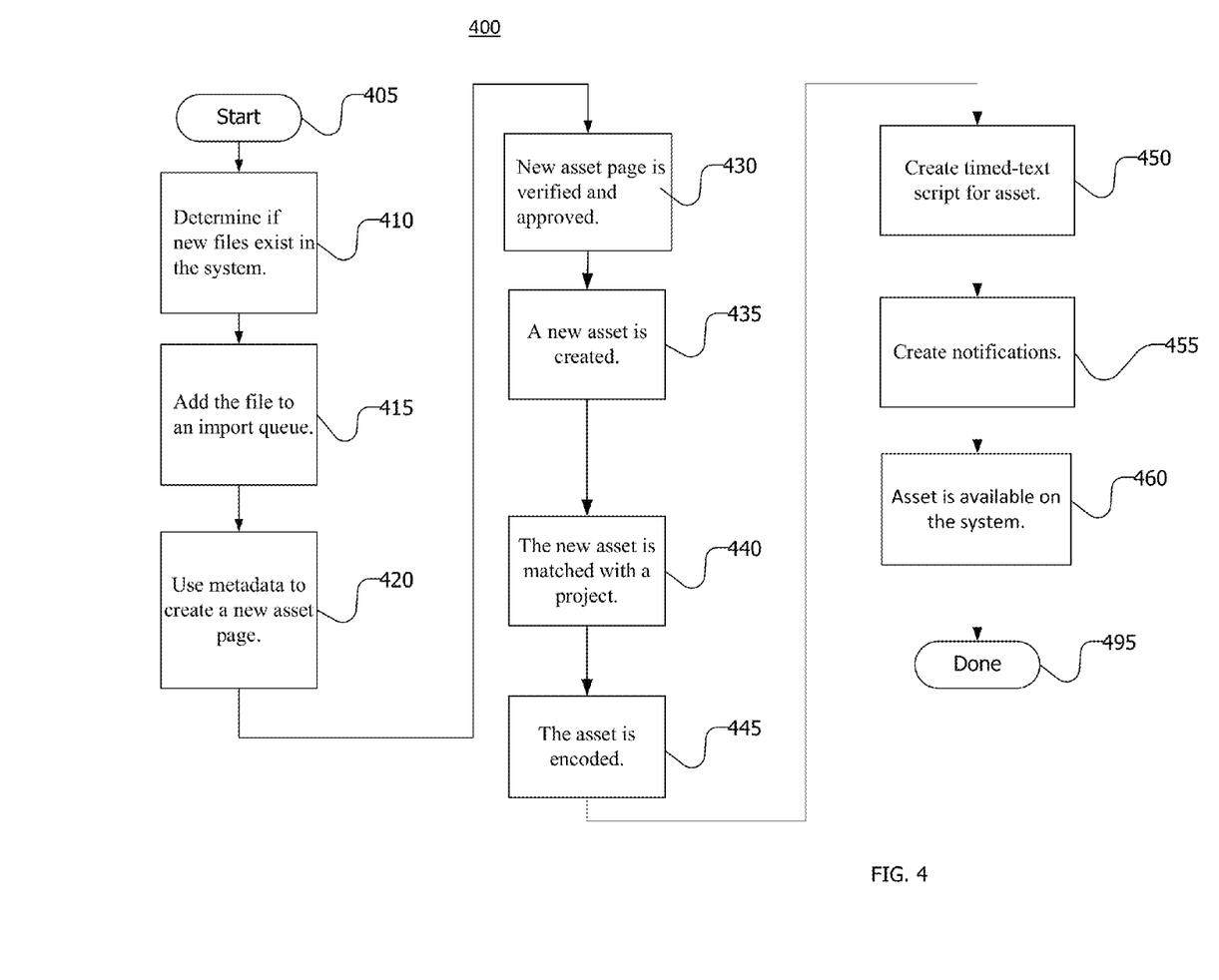
FIG. 4 is a flowchart of a process performed by a localization process system.

The server 340 may also comprise an importer engine 345. The importer engine 345 provides the functionality to allow projects and assets to be imported into the platform. For example, a user may use the importer engine to upload an asset, such as a movie trailer, to a project already existing on the system. In addition, a user may use the importer engine to upload an asset, such as a red carpet interview, to a project that already exists on the system. After projects and assets have been imported into the system, users can use the system to view the projects and assets, modify the assets, or order new localized versions of a project or asset. FIG. 4, which will be discussed subsequently, provides a flowchart of the importer engine 345.

Figure 6:
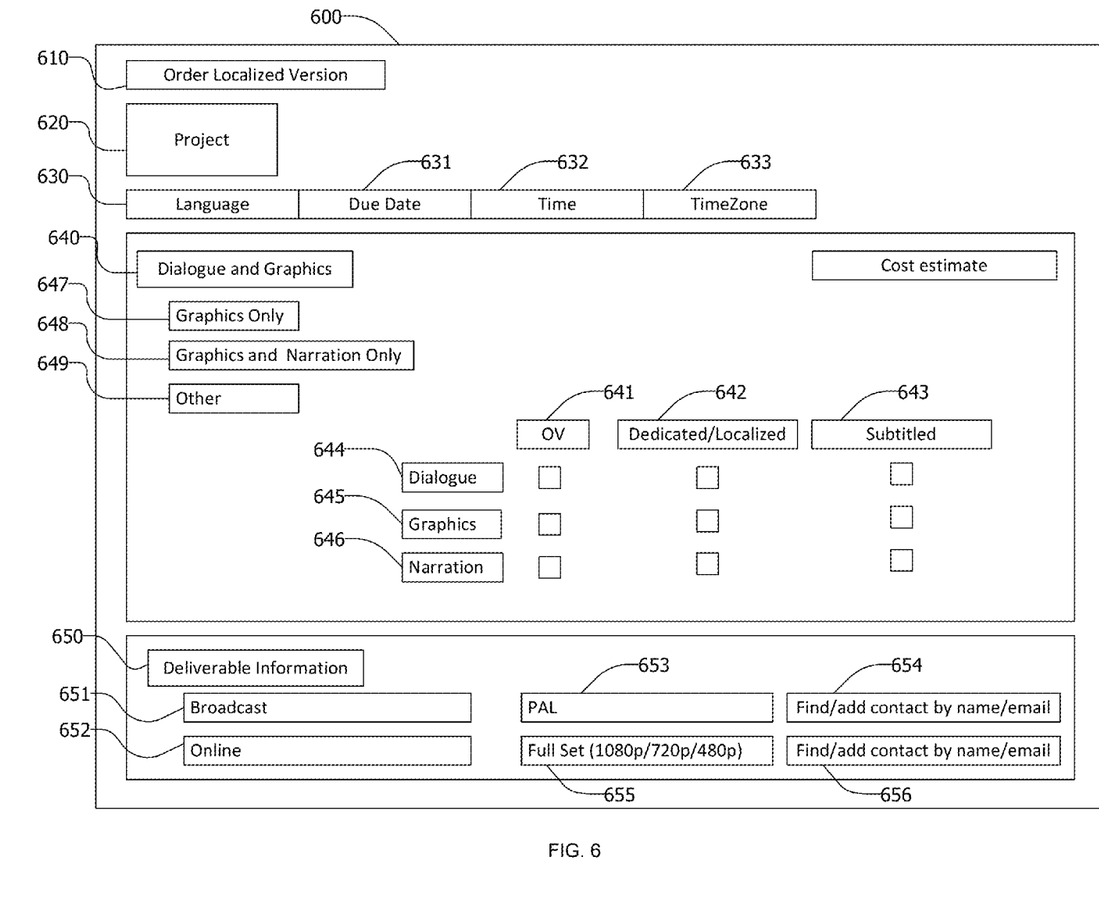
FIG. 6 is an example of a display for a localization process system.

The server may also comprise an ordering assets engine 346. The ordering assets engine 346 provides the functionality to allow users to order localized versions of a project or asset. After a user orders a project or asset, the user may be provided with an interface to pay for the localized version. After the user completes paying for the order, the user may be informed through email that the localized version of the project or asset is ready. FIG. 6, which will be discussed subsequently, provides a flowchart of the ordering assets engine 346.

The client 310 comprises a user interface 311, a web browser 312, and an email client 313. A user 330 interacts with the localization process system 300 via the user interface 311 on the client 310. The client 310 includes a web browser 312 and an email client 313. The client 310 incorporates a web browser 312 for accessing web pages served by the web server 343. The client 310 also includes an email client 313 for receipt of emails from the server 340 regarding access to new projects or orders for localized versions of the projects or assets.

Description of Processes

Referring now to FIG. 4, a flowchart of a process performed by an importer engine, such as importer engine 345 in FIG. 3, is shown. The flowchart 400 has both a start 405 and an end 495, but the process is cyclical in nature. The importer engine typically adds new projects or assets to the system by allowing users to import new projects or assets to the system.

The process 400 begins at 410, wherein the system determines if new files exist in the system. The localization process system may have a background process that monitors to determine if a user has placed new files, for an asset or project, into the system. The background process may check a certain defined storage area on the system every second to determine if a new file exists on the system. If a user has placed a new file into the system, the system will determine such when the process scans the system. The system may determine that a new file exists by a defined storage area on the server.

The file may have a certain naming convention that will help the system to identify a project that the file should be associated with. For example, the filename may have a three character identification for the project, such as MVA for "Movie A." In addition, the filename may state the type of asset it is. For example, if it is a featurette, the filename may include the word "featurette." Similarly, if the asset is a film clip. The name, "film clip", or an abbreviation, may be included in the filename. The filename may also include the title of the work, the running time, a language code, a text type, a custom tag, a version, a codec, an encode name and a file type extension. An example of a language code may be "ENG" for English, or "BPO" for Brazilian Portuguese, or CSP for Castilian, GER for German, ITA for Italian, JPN for Japanese, KOR for Korean, LAS for Latin American Spanish, MAN-TW for Mandarin for Taiwan, PFT for French-Parisian, SWE for Swedish. In addition, the language code may include territory specific identifiers. Examples of territory specific identifiers include LAS-AR for Latin American Spanish for Argentina, GER-AT for German for Austria, ENG-AU for English for Australia, ENG-ZA for English for South Africa, ARA-PFR for a dual Arabic/French Subtitled version. An example of a text type is SUB for subtitled, DUB for dubbed, TXTD for texted and TXTL for textless. Examples of a custom tag may include descriptions such as "Now in Theaters." Examples of codecs include ANIM for animation, DVCPRO, FLV for Flash Video, H264, MP3 and MPEG-2. Examples of encode names may include NTSC, PAL or the high-definition video modes including 1080p.

Next, the system will add the file to an import queue at 415. The import queue is a data structure that may be stored in the storage area on the system, and which is used to store new files added to the system, but have not been approved by the system yet. The new media files may comprise metadata including the owner of the asset. For example, if the project or asset is owned by Movie Studio A, the metadata for the project may identify Movie Studio A as the owner. In addition, the new files may comprise metadata including the territory that it is designated for, the asset type, the codec information, the encode name of the asset, and the name of the project. In addition, a "preview" file may be added to the system. A "preview" file is a file that may be added to the import queue on the system, but is not available for other users to view or access on the system until it has been verified and approved by the system. The preview file may only be viewed or accessed by the user who uploaded it to the system. Alternatively, the user may designate one or more than one users on the system who may have permission to access the preview file. However, the preview file may not be viewed by all of the users on the system until it has been approved and verified. A preview file may be tagged with the word "Preview" in the filename, and may be added to the storage area on the system. The system may generate additional versions of each preview file. For example, the system may generate additional versions of each preview where each version has different bandwidth.

At 420, the localization process system uses the metadata to create a new temporary asset page. The system uses the metadata from the file to create a temporary asset page on the system for the user to view. The temporary asset page is an html page that is prepared and presented to the user who uploaded the file, so that the user may verify the contents of temporary asset page. For example, the system will present the user with a temporary asset page showing the title of the project, a video preview of the file, the territory that it is designated for, and similar metadata and asset specific information.

At 430, the user will verify and approve the temporary asset page. The user will verify whether the content on the temporary asset page is correct or not. The user will have an opportunity to modify incorrect information, resulting in updating the metadata corresponding to that information, if such is seen. After the user confirms the accuracy of the information on the temporary asset page and approves of the content, a new asset, consisting of one or more than one file, is created based on the correct metadata at 435. The new asset will include the correct metadata so that the system can determine which project the new asset belongs to.

At 440, the new asset is matched with a project. Here, the new asset is matched with a project on the system using the metadata of the new asset to determine which project it should be matched with. For example, if the project is Movie A, and the new asset is an asset, such as a movie trailer, for Movie A, the metadata for the new asset will identify Movie A as the project name. Therefore, the system will scan the projects stored on the system to identify the project that the new asset should be associated with. Once the system locates the new project, the system may move the asset from a staging area in the storage area of the system to a production area in the storage area on the system. In addition, the system may update a database to identify a new asset has been associated with the project and may include a hyperlink in the database to identify the location in the production area where the asset is located.

At 445, the asset is encoded if necessary. When an asset is encoded, the system may create multiple files of the asset, where each file has a different encoding so that it may be used in different mediums or different territories. For example, an asset may be encoded into an NTSC format, or PAL format, or other similar formats for different broadcast mediums. In addition, the system may also create different encodes for theatrical, broadcast or online mediums. In addition, the system may generate thumbnails when moving the files so that when a user hovers over a project or asset, they may see a series of frames. After the system encodes the asset, the system moves the encoded files of the asset into the production area on the storage area of the system. The system may also update a database on the storage area to indicate the various encodes of the asset that exist and the locations for each of the encoded files of the asset.

At 450, after the asset, which is the original version, or a version to be localized into another language, has been encoded and moved to the production area on the system, the system may create a script to allow a user to edit a project or translate a project. Specifically, the system may generate a timed-text script in English that may be used as a guide for a translator to translate into another language for subtitling, or in the case of a dubbed version, translate on screen graphics. This timed-text script is associated with the asset so that when a user orders a localized version of an asset, this script will be transmitted by the system with the project to the user to create the localized version of the asset.

At 455, the system may create notifications to inform users on the system that a new asset has been added for a project. Notifications are generated when a system event occurs that corresponds to a user's notification subscription. For example, a user that is subscribed to a project named, "Movie A", should be notified when a new asset for "Movie A" has been added or modified on the system. Therefore, at 455, the system will create a notification and inform all of the users who have subscribed to the project that was updated, to receive a notification that a new asset has been added to the system. The system may achieve this by scanning the users stored in a database on the system, and determining which users have subscribed to the project that was modified. Once the system identifies those users, the system may create a new notification object for the user that has subscribed to the project that has the new asset. The user will then receive a notification that a new asset has been added. The user may receive the notification either with an email or when the user logs into the system.

At 460, the asset is available on the system for all of the users who have permission to access it. A user may view the asset, or order a localized version of the asset, if he has permission to.

Figure 5:
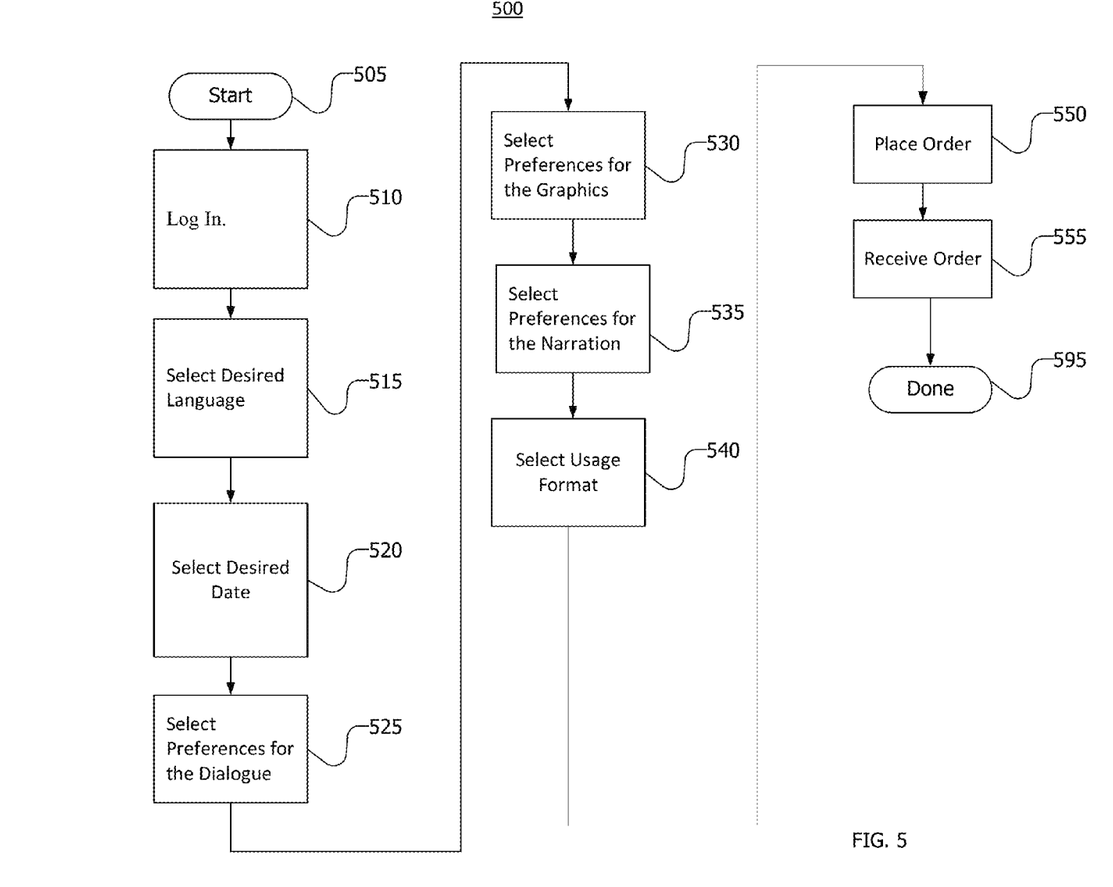
FIG. 5 is a flowchart of a process performed by a localization process system.

Referring now to FIG. 5, a flowchart of a process performed by an ordering assets engine, such as ordering assets engine 346 in FIG. 3, is shown. The flowchart 500 has both a start 505 and an end 595, but the process is cyclical in nature.

At 510, a user logs in. The process 500 begins when a user logs into the system at 510. The authentication engine, such as authentication engine 311 of FIG. 3, will verify if the user is permitted to access the system. After the user logs in, the user selects a project or an asset that they wish to order a localized version for. Again, the system will only offer users to select projects and assets that they have permission to access. When the user logs in, the system uses the user's operating system settings to present the asset to a user based on the user's operating system settings. For example, if the user is located in California, the system will assume that the user wants to navigate the system's interface in English, and will set the system time to Pacific Standard Time. The system may also use the settings of the operating system's user interface to determine the language for the user to determine the available encode standards, such as NTSC or PAL, based on where the user is located. For example, if the user interface is set to France, then the user's default settings in the browser may be French/PAL. If the user interface is set to French Canada, then the user's default settings in the browser may be "Quebecois AKA French Canadian/NTSC".

At 515, the user selects a desired language. The desired language is the language in which the user desires to receive a new version of the project or asset.

At 520, the user selects a desired date. Here, the user provides the system with a date by which the user requests the order to be completed.

At 525, the user selects preferences for the dialogue. Here, the user provides the system with whether the user wants the dialogue to remain in the Original Version ("OV"), or whether to create a dedicated and localized version of the dialogue, or whether to create a subtitled version of the dialogue. The user can select any of these options. If the user selects OV, then the dialogue likely may remain the same in the localized version. If the user selects either a dedicated version of the dialogue, or a subtitled version, then the localized version will include the user's selections for the dialogue. If the user selects a subtitled version, the user may have the option to select who will provide the subtitles. For example, the user may select himself, a $3^{rd}$ party localization vendor, or a subtitling vendor to provide the subtitles.

At 530, the user selects preferences for the graphics. Here, the user provides the system with whether the user wants the graphics to remain in the Original Version ("OV"), or whether to create a dedicated and localized version of the graphics, or whether to create a subtitled version of the graphics. The user may select any of these options. If the user selects OV, then the graphics likely may remain the same in the localized version. If the user selects either a dedicated version of the graphics, or a subtitled version, then the localized version will include the user's selections for the graphics. When a user selects a dedicated or localized version of the graphics, the localized version will include graphics appropriate for the region selected by the user.

At 535, the user selects preferences for the narration. Here, the user provides the system with whether the user wants the narration to remain in the Original Version ("OV"), or whether to create a dedicated and localized version of the narration, or whether to create a subtitled version of the narration. The user can select any of these options. If the user selects OV, then the narration likely may remain the same in the localized version. If the user selects either a dedicated version of the narration, or a subtitled version, then the localized version will include the user's selections for the narration.

At 540, the user selects the usage format. Here, the user can select whether the localized version will be used to broadcast, or will be used online, or will be used in a theater. The format of the localized version will vary dependent on the usage of the localized version.

At 550, the user places an order for the localized version. After the user makes the selections for the localized version, the user may submit the order to the system. An example of a display allowing a user himself to create a localized version with the user's own subtitles, can be seen in FIG. 7. Alternatively, the user may identify another person or entity, who the user wants to create the localized version. The user may indicate this person by entering an email address for the person, or entity, into the system requesting that the person with the designated email address handle creating the localized version of the project. For example, if a user knows that a certain individual is proficient in a certain language, the user may request that the translations be performed by this individual. The translations could be applicable to graphics, to the dialogue or to subtitles. When the user places the order, the user may be required to pay for the order of the localized version. The user may be charged based on the production cost for the length of the project (for a dubbed version), or the production cost for the length of the project (for a subtitled version), or for broadcast files, or for online files. The fees for the project may vary based on these selections.

When a user places an order with the system, the system creates the localized version of the project by using the timed-text script that was created by the system, and which is described in FIG. 4. For example, the system may use the timed-text script to edit and create the localized version of the project. Alternatively, if the user requested another person to create the localized version, then the other user can utilize the timed-text script associated with the project, or asset, to create the localized version. If the user is requesting to modify the translation himself, the system may provide the user with a graphical interface to edit the timed-text script for the localized version of the project.

At 555, the system receives the completed order. The selections the user made regarding the order will be used as the metadata for the new localized asset that will be created. For example, if the user requested subtitles, then the metadata for the new localized asset will identify that the asset has subtitles. If the user requested another person or entity to create the localized version, then the system will notify the person who was requested to edit the asset to create a localized version. The person, or entity, who will edit the asset, will receive the timed-text script to assist in creating the localized version. After the person completes the edits, the system will receive the edited timed-text script and will create a new localized asset using the edited timed-text script. The system will create metadata for the new localized asset so that the system can properly match the new localized asset with the appropriate project on the system. After the localized version is created, the user will be notified via email that the order is ready. Alternatively, the user will be notified when he logs into the system and sees a notification that his localized asset is available. The localized version will be created based on the user's selections for the localized version of the project. After the localized version is created and approved, the system may send the localized version to a destination address that the user specified during the ordering process. The address can be a broadcast station, a 3rd party vendor or an individual. If the user specifies a destination address, then the system will send the localized version to the destination address, and then will inform the user that the transfer to the destination address succeeded.

Referring now to FIG. 6, there is shown an example of a display 600 for a subtitle management system. Specifically, the display 600 shows the user interface that a user, such as user interface 311 and the user 330 in FIG. 3, can use to order a localized version of an asset or a project.

The display 600 shows the user interface for ordering a localized version 610. As seen in the interface, the user will see the project 620 for which the localized version is being requested. In addition, the user will be able to select the language 630, the due date 631, the time 632 and the time zone 633 for the localized version.

In addition, the user will be able to provide input regarding the dialogue and graphics 640 for the localized version. The user may select to order only graphics for the localized asset, as seen in 647. Alternatively, the user may select to order graphics and narration for the localized asset, as seen in 648. Alternatively, the user may select other options for the localized asset, as seen in 649. For example, the user may select Original Version (OV) 641, dedicated/localized version 642, or subtitled 643 for any of the Dialogue 644, the Graphics 645 or the Narration 646. The user may utilize the user interface to select the deliverable information for the localized asset, as seen in 650. For example, the user may select the localized asset should be generated for broadcast, as seen in 651. If the user selects that the localized asset will be used for broadcast, the user may select the encoding appropriate, such as PAL, as seen in 653. Finally, the user may also add a person's contact or email, seen in 654, who the user wishes to receive the localized asset after the localized asset has been created. The user can specify an individual, or the user can specify a network. If the user specifies a delivery address, then the system will deliver the localized asset to the delivery address, and then the system will notify the user that the transfer to the delivery address succeeded. Alternatively, the user may select that the localized asset should be generated for online viewing, as seen in 652. If the user selects online as the deliverable information, the user may also select the encoding type. For example, the user in FIG. 6, selected "Full Set (1080p/720p/480p)" as seen in 655. Finally, the user may also identify a person's contact or email information, seen in 656, who the user wishes to receive the localized asset after the localized asset has been created. The user can specify an individual, or the user can specify a network. If the user specifies a delivery address, then the system will deliver the localized asset to the delivery address, and then the system will notify the user that the transfer to the delivery address succeeded. After the user makes the selections, the user may submit his order to the system to order the localized version.

Figure 7:
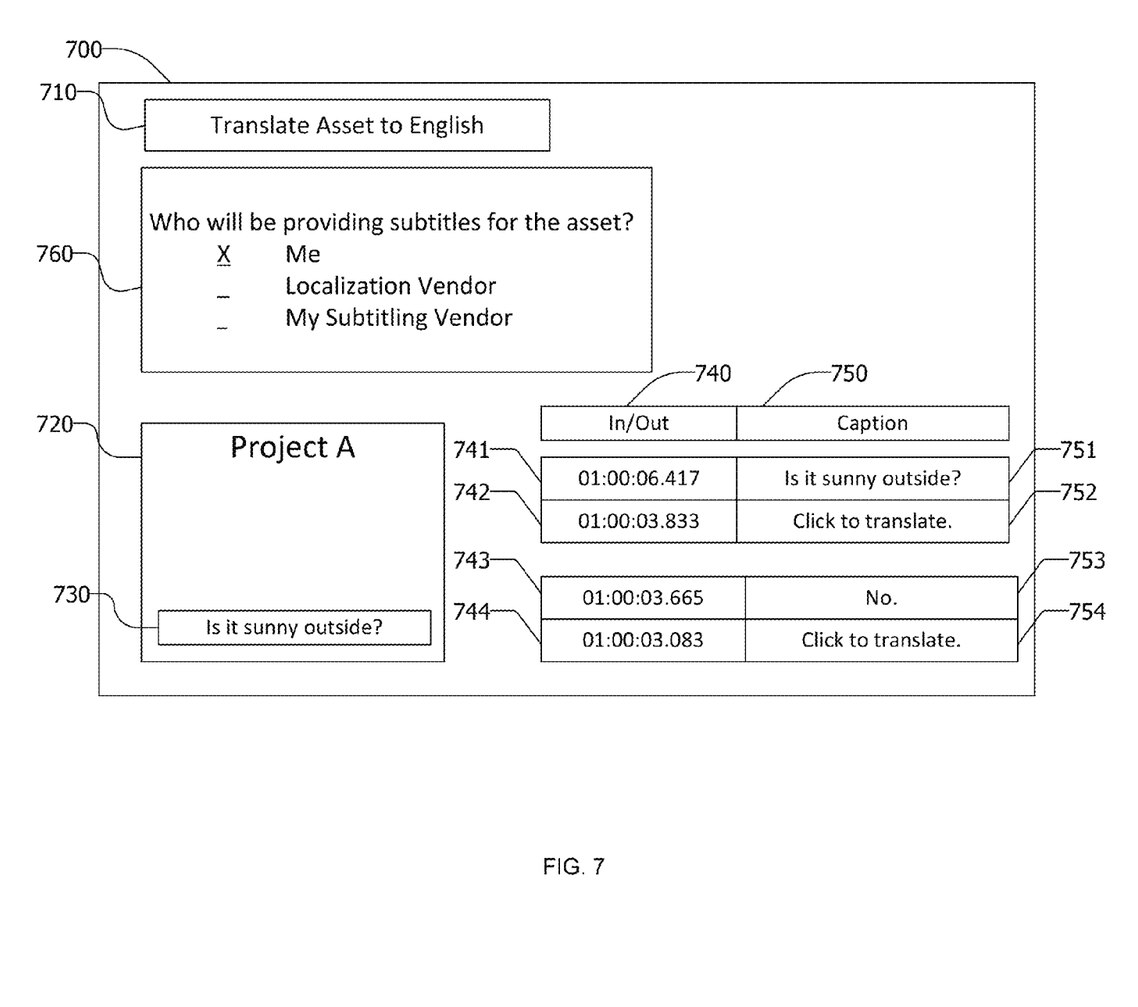
FIG. 7 is an example of a display for a localization process system.

Referring now to FIG. 7, there is shown an example of a display 700 for a localized process system. Specifically, the display 600 shows the user interface that a user, such as user interface 311 and the user 330 in FIG. 3, can use to update the subtitles and create a localized version of an asset or a project.

The display 700 shows the user interface for translating an asset for a project, namely Project A, to English 710. As seen in the interface, the user will see Project A 720 on the display. At 760, the user can identify who will be providing the subtitles for the asset. For example, the user can select, "Me", "Localization Vendor," or "My Subtitling Vendor." If the user selects himself, then the user interface will show the user the dialogue of the asset. The user can then modify the dialogue as he chooses. For example, the user may see two columns, the "In/Out" column 740, and the "Caption" column 750. The In/Out 740 column may provide the time the dialogue appears in the project. The Caption 750 column may show the dialogue for the movie in the original language for the project.

The display 700 shows how a user can create a localized version by updating the subtitles for the project or asset. In the display 700, the In/Out 740 column shows four time entries, namely "01:00:06.417" 741, "01:00:03.833" 742, "01:00:03.665" 743 and "01:00:03.083" 744. For each of the time entries, the Caption 750 column shows the dialogue. For example, for "01:00:06.417" 741, the caption is "Is it sunny outside?" 751. For "01:00:03.833" 742, the caption column states "Click to translate" 752. This indicates that a user can update the caption and then play the project and the project will show the updated caption at the time shown in the In/Out column. In addition, for "01:00:03.665" 743, the caption is "No" 753. Finally, for "01:00:03.083" 744, the caption again states "Click to translate" 754. This again indicates that a user can update the caption and then play the project and the project will show the updated caption at the appropriate time.

After the user edits the dialogue, he can select to view his edits. The system will stream the asset and show the user a preview of the subtitles he added, or modified. This allows the user to confirm his modifications are accurate, before ordering the localized version of the asset.

As seen in the display 700, Project A 720 shows the subtitle "Is it sunny outside?" 730. This is the caption that corresponds to 741 in the In/Out column. Project A 720 shows the updated captions immediately. Therefore, the user can confirm the edits are appropriate and maintain the integrity of the project after the translation.

Closing Comments

Although shown implemented in a personal computer, the processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including, for example, variations of the Linux, Microsoft Windows, Symbian, and Apple Mac operating systems.

The techniques may be implemented with machine readable storage media in a storage device included with or otherwise coupled or attached to a computing device. That is, the software may be stored in electronic, machine readable media. These storage media include, for example, magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of" respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus comprising a storage medium storing a program having instructions which when executed by a processor will cause the processor to:
authenticate a user login for a localized process system;
present a user with a project, comprising an asset, wherein the asset is created for an original geographical territory;
present the user with a display to order a localized version of the asset, wherein the localized version of the asset is a version of the asset that is customized for a second geographical territory that is different than the original geographical territory;
receive user input to create subtitles for the localized version of the asset, wherein the user selects a second user to enter the subtitles
present the second user with a display of a timed-text script that displays a time of the asset, and the dialogue of the asset
receive user input of a new subtitle that the second user entered on the display
generate a new timed-text script with the new subtitle
notify the user that the localized version of the asset is complete
receive an order to create the localized version of the asset, wherein the localized version of the asset is created using the new timed-text script.

2. The apparatus of claim 1 wherein the asset is an international trailer for the movie.

3. The apparatus of claim 1 wherein the user selects to preview the asset with the new subtitle before submitting an order for the localized version of the asset.

4. The apparatus of claim 1 wherein the asset is a red carpet interview recorded from a movie premier for the movie.

5. The apparatus of claim 1 further comprising
receiving user input of new graphics for the localized version of the asset.

6. The apparatus of claim 5 wherein the user enters a third user's email address to provide the new graphics for the localized version of the asset.

7. The apparatus of claim 1 further comprising
receiving user input to create the localized version of the asset for broadcast in PAL.

8. The apparatus of claim 7 further comprising
receiving user input of an email address for a person who will create the localized version of the asset in PAL.

9. The apparatus of claim 1 further comprising
receiving user input to create the localized version of the asset for online viewing.

10. A method comprising:
authenticating a user login for a localized process system;
presenting a user with a project, comprising an asset, wherein the project is a movie, and wherein the asset is created for an original geographical territory;
presenting a user with a display to order a localized version of the asset, wherein the localized version of the asset is a version of the asset that is customized for a second geographical territory that is different than the original geographical territory;
receiving user input to create subtitles for the localized version of the asset, wherein the user selects a second user to enter the subtitles
presenting the second user with a display of a timed-text script that displays a time of the asset, and the dialogue of the asset
receiving user input of a new subtitle that the second user entered on the display
generating a new timed-text script with the new subtitle
notifying the user that the localized version of the asset is complete
receiving an order to create the localized version of the asset, wherein the localized version of the asset is created using the new timed-text script.

11. The method of claim 10 wherein the asset is an international trailer for the movie.

12. The method of claim 10 wherein the user selects to preview the asset with the new subtitle before submitting an order for the localized version of the asset.

13. The method of claim 10 wherein the asset is a red carpet interview recorded from a movie premier for the movie.

14. The method of claim 10 further comprising
receiving user input of new graphics for the localized version of the asset.

15. The method of claim 10 wherein the user enters a new user's email address to provide the new graphics for the localized version of the asset.

16. The method of claim 10 further comprising
receiving user input to create the localized version of the asset for broadcast in PAL.

17. The method of claim 10 further comprising
receiving user input to create the localized version of the asset for online viewing.

18. The method of claim 17 further comprising
receiving user input of an email address for a person who will create the localized version of the asset in PAL.

19. An apparatus comprising a storage medium storing a program having instructions which when executed by a processor will cause the processor to:
authenticate a user login for a localized process system;
present a user with a project, comprising an asset, wherein the asset is created for an original geographical territory;
present the user with a display to order a localized version of the asset, wherein the localized version of the asset is a version of the asset that is customized for a second geographical territory that is different than the original geographical territory;

receive user input of new graphics needed for the localized version of the asset present the user with a display of a timed-text script that displays a time of the asset, and the time location of the graphics of the asset receive user input of a new graphic that the user entered on the display generate a new timed-text script with the new graphic notify the user that the localized version of the asset is complete receive an order to create the localized version of the asset, wherein the localized version of the asset is created using the new timed-text script.

20. The apparatus of claim 19 wherein the user selects to preview the asset with the new graphic before submitting an order for the localized version of the asset.

21. An apparatus comprising a storage medium storing a program having instructions which when executed by a processor will cause the processor to:

authenticate a user login for a localized process system;

present a user with a project, comprising an asset, wherein the asset is created for an original geographical territory;

present the user with a display to order a localized version of the asset, wherein the localized version of the asset is a version of the asset that is customized for a second geographical territory that is different than the original geographical territory;

receive user input to create a new audio for the localized version of the asset, present the user with a display of a timed-text script that displays a time of the asset, and the time location of the audio of the asset receive user input of a new audio that the user entered on the display generate a new timed-text script with the new audio notify the user that the localized version of the asset is complete receive an order to create the localized version of the asset, wherein the localized version of the asset is created using the new timed-text script and the new audio.

22. The apparatus of claim 21 wherein the user selects to preview the asset with the new audio before submitting an order for the localized version of the asset.

23. The apparatus of claim 21 wherein the new audio includes a new narration.

24. The apparatus of claim 21 wherein the new audio includes a new dialogue.

25. The apparatus of claim 21 wherein the new audio includes a new sound effect.

26. The apparatus of claim 21 wherein the new audio includes a new musical component.

* * * * *

UNITED STATES PATENT AND TRADEMARK OFFICE
CERTIFICATE OF CORRECTION

PATENT NO. : 9,578,359 B2  
APPLICATION NO. : 15/004678  
DATED : February 21, 2017  
INVENTOR(S) : Nathan Abele et al.

Page 1 of 1

It is certified that error appears in the above-identified patent and that said Letters Patent is hereby corrected as shown below:

On the Title Page

Item (73) Assignee: "Pixwell Platform, LLC" replace with --Pixwel Platform, LLC--

Item (57) Abstract: Line 14 "dialog" replace with --dialogue--

Signed and Sealed this
Second Day of May, 2017

Michelle K. Lee
*Director of the United States Patent and Trademark Office*